United States Patent [19]

Morris

[11] Patent Number: 4,728,129
[45] Date of Patent: * Mar. 1, 1988

[54] HYDRIL-TYPE CONNECTOR

[76] Inventor: James B. N. Morris, 22 Colony Rd., Gretna, La. 70053

[*] Notice: The portion of the term of this patent subsequent to Apr. 25, 1995 has been disclaimed.

[21] Appl. No.: 843,023

[22] Filed: Mar. 24, 1986

Related U.S. Application Data

[62] Division of Ser. No. 409,059, Aug. 18, 1982, Pat. No. 4,598,455, which is a division of Ser. No. 871,336, Jan. 23, 1987, Pat. No. 4,496,175, which is a division of Ser. No. 736,492, Oct. 28, 1976, Pat. No. 4,085,951.

[51] Int. Cl.$^4$ .............................................. F16L 15/00
[52] U.S. Cl. ..................... 285/334; 285/347; 285/351; 285/355
[58] Field of Search .................... 285/332.3, 333, 334, 285/347, 351, 355, 390

[56] References Cited

U.S. PATENT DOCUMENTS

| | | | |
|---|---|---|---|
| 2,110,825 | 3/1938 | Archer | 285/332.3 X |
| 2,150,221 | 3/1939 | Hinderliter | 285/332.3 |
| 2,259,232 | 10/1941 | Stone | 285/390 X |
| 2,262,210 | 11/1941 | Stone | 29/401 |
| 2,992,019 | 7/1961 | MacArthur | 285/334 |
| 3,100,656 | 8/1963 | MacArthur | 285/333 X |
| 3,336,054 | 8/1967 | Blount | 285/333 X |
| 3,822,902 | 7/1974 | Maurer | 285/333 X |
| 3,947,942 | 4/1976 | Blocker | 29/401 C |
| 4,009,893 | 3/1977 | Schatton | 285/332.3 |
| 4,085,951 | 4/1978 | Morris | 285/334 |

Primary Examiner—Andrew V. Kundrat
Attorney, Agent, or Firm—Murray and Whisenhunt

[57] ABSTRACT

An improved pressure type connection on stepped-thread Hydril-type tubing and casing tool joints is disclosed, wherein a secondary sealing means is included between the stepped threaded areas of the Hydril-type connector. The secondary sealing means includes an annular ring of relatively rigid, internally tenacious plastic or rubber material, which serves to contain well pressure if the metal-to-metal sealing surfaces on the pin and box members of the Hydril-type connector are damaged. With such secondary sealing rings, damaged Hydrill-type connectors can still be used, without having to scrap same, or having to repair the damaged area at great expense.

7 Claims, 9 Drawing Figures

U.S. Patent  Mar. 1, 1988  4,728,129
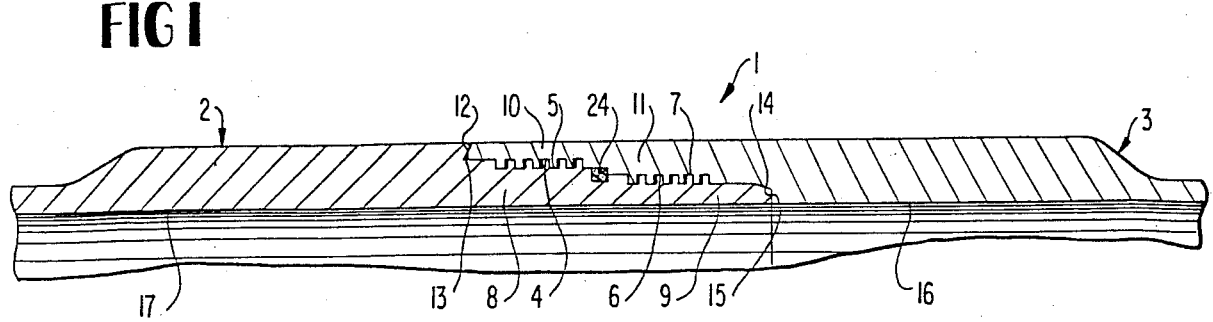
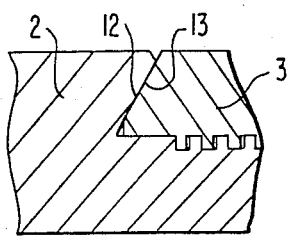
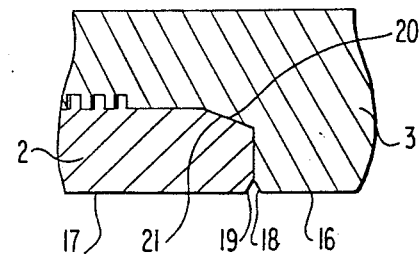
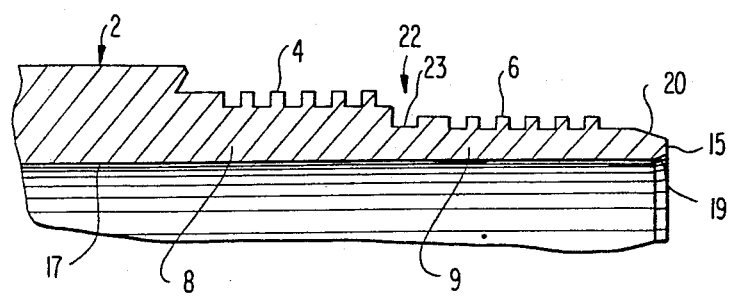
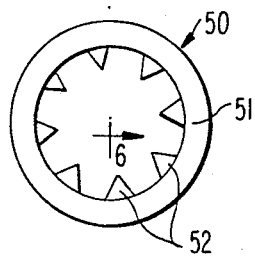
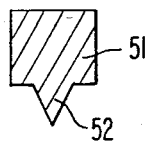
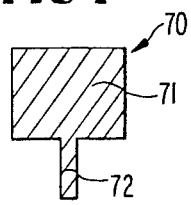
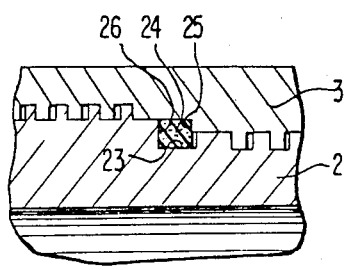

HYDRIL-TYPE CONNECTOR

RELATED APPLICATIONS

This application is a division of Ser. No. 409,059 filed Aug. 18, 1982, U.S. Pat. No. 4,598,455, which is a division of Ser. No. 871,336 filed Jan. 23, 1987, U.S. Pat. No. 4,496,175, which is a division of Ser. No. 736,492 filed Oct. 28, 1976, U.S. Pat. No. 4,085,951.

BACKGROUND OF THE INVENTION

In oil fields, drill strings are frequently connected by Hydril-type connectors, which involve a two step thread design, as is well known to those in the art. For instance, Hydril-type connectors are disclosed in U.S. Pat. No. 2,532,632, the disclosure of which is hereby incorporated by reference for the teachings of the Hydril-type connectors therein.

The prior art has made extensive use of "O" rings and similar sealing means, in the sealing of pipes and the like. See, for instance, U.S. Pat. Nos. 3,054,628; 3,167,333; 2,980,451; 2,889,733; 2,813,567; 2,770,477; and 2,553,340. Generally the sealing rings or gaskets of these prior art patents have been made of Teflon or similar plastic material.

The use of rings of plastic or rubber, or the like, in rotary tools is also known to the art, see, for instance, U.S. Pat. Nos. 2,102,072 and 2,110,127. Finally, the use of Teflon as a sealing ring in Hydril-type connectors is disclosed in U.S. Pat. Nos. 2,907,589 and 3,100,656. In these patents, the Teflon seal ring is located in the area of the free terminal forward end of the pin member of the Hydril-type connector. If such sealing rings are located on the pin member, they are highly susceptible to damage, and if located on the box member they are quite difficult to install, and subject to a tendency to be locally deranged in an unpredictable manner as the joint is made up.

The present invention generally relates to improvements in threaded type joints, and in particular relates to the design and construction of sealed, screw-threaded oil well tubing and drill string joints which are capable of being rapidly made up to postive pressure seal condition, and rapidly broken apart without damage to the threads or seal during either make up or breaking of the joint under conditions of repeated severe usage in the field. In particular, the present invention is directed to improvements in Hydril-type connectors, wherein the connector is capable of maintaining full well pressure, even though the conventional metal-to-metal seating surfaces of the Hydril-type connector are damaged. The present invention is applicable to inserted joints, wherein one pipe end is screwed directly into the end of another pipe end, to couplings in which the opposed ends of two pipes are threaded into a tubular collar, and to other similar types of pipe end connections.

As acknowledged hereinabove, many different designs of screw threaded pin and box type tubing and drill pipe joints have been proposed by the prior art. However, in spite of the many proposals, a number of problems have remained unsolved, especially those problems having to do with a method of adequately and enduringly sealing a Hydril-type connector after the metal-to-metal seating surfaces have been damaged, which is a frequent occurrence, against the extremely high fluid pressures which are encountered in deep drilled oil and gas wells. For instance, such pressures might range as high as 15,000 psi.

The rubber O-rings and compressible rubber gaskets, such as those acknowledged hereinabove, have from time to time been used to seal pipe and tubing joints, and under certain operating conditions, especially when relatively low pressures are involved, they have proven to be thoroughly satisfactory. However, such seals have not been suitable for use under the high temperature and pressure conditions which are encountered in deep oil and gas wells. For one thing, these relatively thin rubber rings tend to be badly damaged, and often rendered useless, by being extruded under the well pressure into small clearances between the joint members at the seal ring groove. Compressive ring gaskets, such as of rubber and asbestos, have also been found to be susceptible to damage, probably as a result of a combination of sliding friction and high compressive loads, during make up of the pipe joint with power tools.

Joints used for the purpose of connecting drill pipe lengths or tubing lengths must be made up with a tight fit on tapered lateral contact surfaces in order to provide the required degree of rigidity needed to resist lateral bending stress with a minimum of fatigue. It is, however, difficult to produce sealed joints having both a tight fit on tapered, lateral contact surfaces, and a longitudinally compressed ring gasket, as even very small variations in the machining of the tapered lateral contact surfaces results in significant displacement variations in the longitudinal make up of the joints, with resultant differences of degree in the amount of compression applied to the ring gasket, which will sometimes be damaged by too great a compression, or may be compressed insufficiently to adequately seal the joint.

Difficulties of this nature have lead to the use of special pipe and tubing joints which have tapered seating elements employing high polished metal-to-metal fits as a means of sealing against very high oil pressure, and such joints, when made up carefully under ideal conditions, are entirely capable of sealing against such high well pressures. This type of joint, referred to hereinafter as the Hydril-type connector, is generally more costly to manufacture than more conventional pipe and tubing joints, and the polished sealing surfaces or seats are quite susceptible to damage when the joints are made up and broken out under operating conditions encountered in the oil fields. Damage may occur as a result of direct or sliding impact of the pin seat against the end of the box when the lower end of a suspended, relatively heavy pipe stand is stabbed into a joint on the upper end of the pipe which precedes the suspended pipe stand into the well.

Furthermore, the polished metal-to-metal sealing areas or seats are also quite susceptible to damage at the time the joints are screwed together, as even quite small particles of dirt or sand, if trapped between the mating seats, are capable of scoring or producing galling which may completely destroy the effectiveness of the metal-to-metal seal. Excessive friction, caused by overtightening, lack of lubrication, or rapid make up, will occasionally cause the tight fitting metal-to-metal seats to gall during the last fraction of a turn as the joints are screwed together.

In an effort to avoid the entrapment of dirt and sand particles between the seating surfaces as the joints are screwed together, the prior art has customarily made the metal-to-metal contact area between the seats relatively narrow. The prior art may provide one joint member with an arcuate seating surface and the mating member with a conical seating surface to obtain a line of contact between the two surfaces. However, such narrow seating surfaces are not generally desirable because they are quite vunerable to attack by the corrosive fluids which are often present in oil and gas wells. In this regard, the corrosive need penetrate only a relatively short distance in order to completely destroy the line of metal-to-metal contact existing between the two joint surfaces, and thereby destroy the seal.

Thread damage is frequently caused by the vertical stabbing of threaded pin ends of suspended heavy pipe stands into threaded box ends of pipe or pipe collars supported beneath the pipe stands. This damage usually occurs when the entire stabbling load falls on the relatively thin and frail thread ends of the threaded pin and box members. A damaged end thread on one joint member will often damage, and occasionally destroy, a number of additional threads on both members should the pin and box be screwed together before the thread end damage is discovered.

The Hydril-type connectors, because of their relatively delicate sealing areas, are easily damaged. Damage to the Hydril-type connector sealing areas has heretofore required that the unit be scraped, or shop repaired at great expense.

The Hydril Company commercially offers a patented tubing connection, with a Teflon ring located in the box member at a location such that when the connection is made up the ring will be at the free terminal end of the pin. It is indicated that the prime purpose of this ring is to complete the corrosion protection afforded by plastic coated pipe. The advertising material also indicates that the connection may be specified where an additional highpressure seal is desired.

The Rucker Atlas Bradford Company has offered leak-proof tubing to the trade, using conventional thread profile, but modifying the coupling by machining out one and one-half threads near each end of the internally threaded coupling and installing a Teflon ring in the resultant retaining groups. In another version, a pin and box member design is provided wherein a groove is machined inside the box member to retain a Teflon seal ring.

SUMMARY OF THE INVENTION

The present invention is directed to a joint for interconnecting a pair of pipes, preferably pipes used in an oil field drill string. A joint includes coaxial pin and box members which have interengaged external and internal two step threads respectively. The threads have substantially the same pitch and outline characteristics, and upon the pin member being screwed about the its longitudinal axis forwardly into the box member, the pipes are held against separation. The annular shoulder member on the pin member between the two threaded areas includes an annular recess opening radially outwardly and extending about the shoulder area, with an annular continuous ring of Teflon or the like received in the recess and being compressed between the pin member and the box member to seal the pipe even if the primary metal-to-metal seating surfaces of the joint are damaged.

DETAILED DESCRIPTION OF THE INVENTION

The present invention will be more readily understood by reference to the accompanying drawings wherein:

FIG. 1 is a cross-sectional view of a typical joint of the present invention;

FIGS. 2 and 3 are expanded views of the free terminal forward end of the box and the pin, respectively, of FIG. 1;

FIG. 4 is an enlarged view of the pin member of FIG. 1;

FIG. 5 is a side view of the sealing ring used in the present invention;

FIG. 6 is a cross-sectional view of the ring of FIG. 5, taken along the line 6—6;

FIG. 7 is a view similar to FIG. 6, but illustrating a different embodiment of the sealing ring member;

FIG. 8 is a view similar to FIG. 6, illustrating yet another embodiment of the sealing ring; and FIG. 9 is an expanded view of the sealing ring 24 of FIG. 1.

In FIGS. 1, 2, 3 and 4, the joint 1 shown therein includes pin member 2 and box member 3 having interengaged two step threads, with threads 4 and 5 interengaged in one step, and threads 6 and 7 interengaged in a second step. The pin and box member are of the two-step type, with pin threads 4 and 6 cut on steps 8 and 9 respectively and being of the same pitch and outline characteristics. In the similar manner, box member threads 5 and 7 are complimentary to pin threads 4 and 6 and are cut on steps 10 and 11. At the outer end of the box there is provided a tapered box stop shoulder 12 which is complimentary to an opposed pin stop shoulder 13, while at the inner end of the box there is a square cut shoulder 14 and a complimentary square cut pin shoulder 15. When the joint 1 is fully made-up, tapered pin and box stop shoulders 20 and 21 are in compressive engagement near the forward end of the pin.

The box and pin members have rather shallow bevels or chamfers 18 and 19 intersecting the box and pin bores 16 and 17 and also intersecting the box shoulder 14 and the pin foremost extent 15, respectively. The bevels are generally coaxial and typically will extend at around 20 degrees angularity with the bores 16 and 17 as illustrated.

The mating shoulders provide metal-to-metal seating surfaces, serving to seal the joint against outward escape of high fluid pressure from the joint. However, upon damage of one or more of the shoulders, the joint may no longer be capable of retaining full well pressure. The present invention is directed to providing a connector which will contain full well pressure in the pipe, even though the mating metal-to-metal shoulders are damaged.

To provide this secondary sealing means, which seals the interior of the pipe against the fluid pressure therein, in the shoulder area 22 between steps 8 and 9 of the pin a groove 23 is provided. This groove is typically of a width corresponding to about 1 to 5 threads, typically about 1½ to 2 threads in width. An annular ring 24 of relatively rigid internally tenacious plastic or rubber material, such as, for instance, of Teflon (polytetrafluoroethylene) is provided in the groove. The ring 24 is of such a size that upon full make up of the joint, the ring is placed under compression between shoulder 26 on pin member 2 and shoulder 27 on box member 3. Generally the ring will be compressed between 10% and 50% of its original width. The ring can take various shapes, and the preferred shape is shown in FIGS. 5 and 6, wherein ring 50 includes an annular ring 51 of square cross-section, having molded segments 52 integral therewith on the inner side of the ring. The segments permit the ring to be slipped over the threads of the pin and retained in groove 23.

The ring 70 of FIG. 7 is an alternative construction, wherein an annular ring 71 of square cross-section includes on its inner surface a relatively thin ring 72, having a plurality of slits (not shown) therein, with slit ring 72 permitting the ring to be slipped over the threads and retained in the groove of the pin member 2.

Finally, FIG. 8 illustrates yet another embodiment of the sealing ring, wherein ring 80 is of square cross-sectional area. This ring may be installed by heating the ring so that the ring expands enough to permit it to be slipped over the pin member threads into groove 23. It is also possible that ring 80 could be actually molded in place in groove 23.

In FIG. 9, ring 24 is illustrated in a compressed condition. Upon make-up of the joint, ring 24 located in groove 23 is compressed between shoulder 25 of box member 3 and shoulder 26 of pin member 2.

A number of other materials can be used in the construction of the sealing ring 24 in addition to Teflon, including such diverse materials as Mylar, hard rubber, nylon, delrin, and the like. Important considerations in the selection of a sealing ring material is that the material be compressible, relatively rigid, and internally tenacious. With Teflon rings, for instance, it is believed that rings designed along the lines described hereinabove will seal Hydril-type connectors up to the bursting strength of conventional oil field pipe itself.

It will be appreciated by those in the art that a considerable cost savings can be achieved with the use of the present invention, because of the high dollar volume of the wasted drill strings wherein the Hydril-type connector threads or seating surfaces are damaged. A typical unit of pipe having Hydril-type connectors thereon would have a length of about 30 feet, and would cost about $6.75 per foot. Thus, a typical unit would cost about $200.00 and thousands of such units are discarded annually by the oil and gas drilling industry.

It will be readily appreciated that the sealing ring 24 of the present invention can be installed on new, unused Hydril-type connectors. However, it is believed that the cost involved on putting such rings on new connectors probably would not justify that approach, and thus it is most likely that the present invention will only be used on damaged Hydril-type connectors. Thus, upon the initial make up of the repaired Hydril-type connector, using the sealing ring of the present invention, the sealing ring would be expected to withstand full well pressure.

Ring 24 should have a outer diameter such that it does not interfer with the threads 5 passing thereby. The use of segments 52 or the like permits some measure of inner movement of ring 51, but it is normally preferred that the outer diameter of ring 51 be less than the inner diameter of box threads 5.

What is claimed is:

1. A joint for interconnecting a pair of pipes, said joint comprising coaxial pin and box members respectively including interengaged external and internal first threads, and interengaged external and internal second threads, said first threads on said pin member being adjacent the free terminal forward end of said pin member and being of smaller outer diameter than said second threads, said threads holding the pipes against separation, said first threads and said second threads having substantially the same pitch and outline characteristics, said pin member being screwed about its axis longitudinally forwardly into box member, metal-to-metal seating surfaces on said pin and box members, said surfaces in interengagement when undamaged, an annular pin member shoulder providing a stepped portion on said pin member between said first threads and said second threads, an annular box member shoulder providing a stepped portion on said box member shoulder providing a stepped portion on said box member between said first threads and said second threads, said pin member shoulder being contiguous with an annular groove opening radially outwardly and extending about said pin member, and an annularly continuous ring of relatively rigid, internally tenacious plastic or rubber material received in said groove, the axial relationship between undamaged metal-to-metal seating surfaces, the first and second threads, the ring and the pin member shoulder and the box member shoulder being such that when the said joint is made up to cause said metal-to-metal seating surfaces to interengage, the ring is compressed between said pin member and said box member to form a seal.

2. Joint of claim 1, wherein the length of said first and said second threads is between about ⅓ and about 5 times the internal diameter of said pipes.

3. Joint of claim 1, wherein said ring is of a plastic material.

4. Joint of claim 3, wherein said plastic material is polytetrafluoroethylene.

5. Joint of claim 3, wherein said metal-to-metal seating surfaces comprise tapered stop shoulders.

6. Joint of claim 5, wherein a stop shoulder is located at or adjacent the free terminal forward end of said pin member and a second stop shoulder is located at or adjacent the free terminal forward end of said box member.

7. An interconnectable pair of pipes, one pipe having pin member means at one end thereof, the other pipe having a coaxially interengageable box member means on one end thereof, said pin member means including external thread means having a plurality of steps, said box member means including internal thread means matching said external thread means, said external thread means engaging said internal thread means upon being screwed about the longitudinal axis of the pipes forwardly into said box member means, said thread means steps being of different diameters with the diameter of each stop being larger than the step, if any, closer to the free terminal forward end of said pin member means, seating means on said pin member means and said box member means to provide, when undamaged, a metal-to-metal seal of the interior of said pipes from the exterior of said pipes, an annular pin member means shoulder providing a stepped portion on said pin member between two adjacent external thread steps on said pin member means, an annular box member shoulder means providing a stepped portion on said box member between two adjacent internal thread steps on said box member means, said pin member shoulder means being contiguous with an annular groove opening radially outwardly and extending about said pin member means, and an annularly continuous ring of relatively rigid, internally tenacious plastic or rubber material received in said groove, and being compressed between said pin member and said box member when said pin member seating means and said box member seating means are firmly engaged, to seal the interior of said pipe from the exterior of said pipe if said seating means are damaged.

* * * * *